Patented May 21, 1940

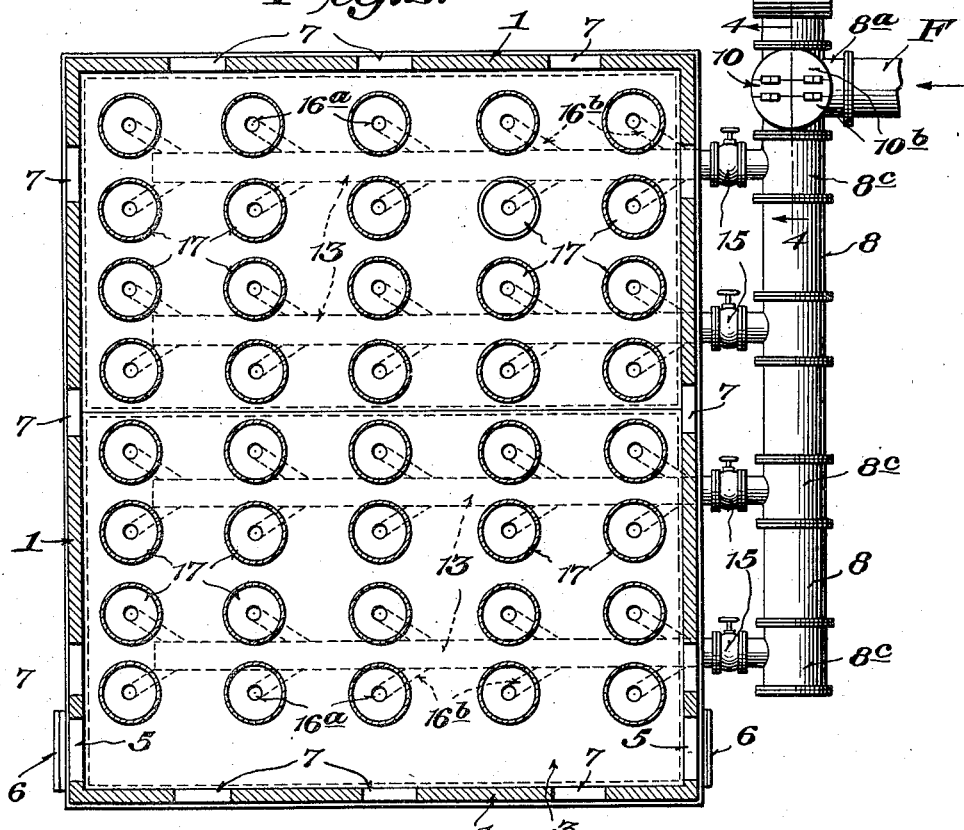
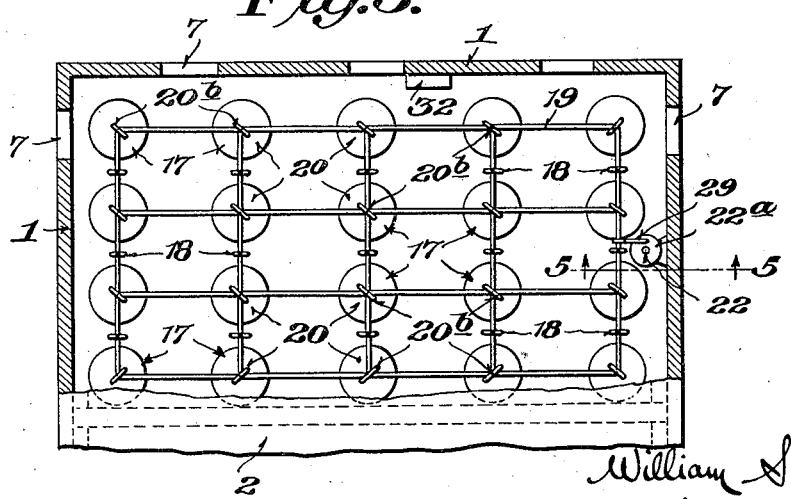

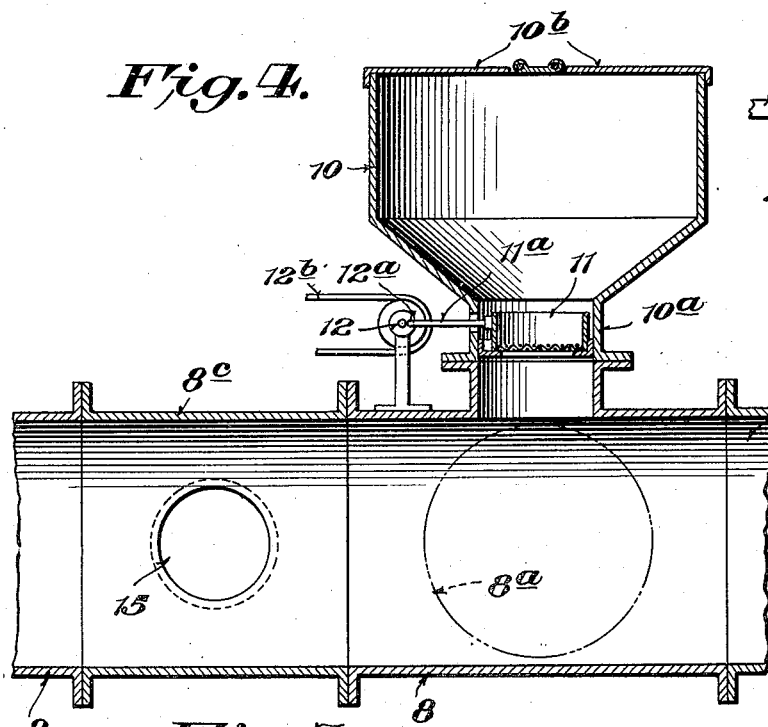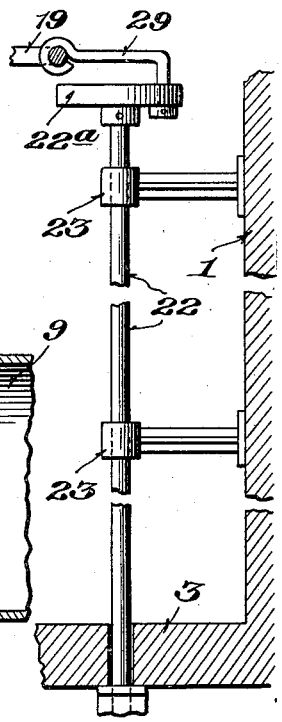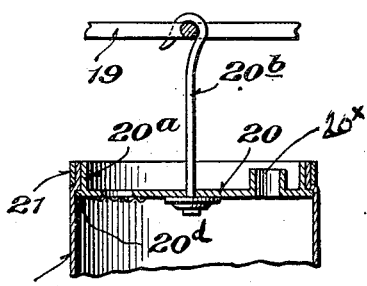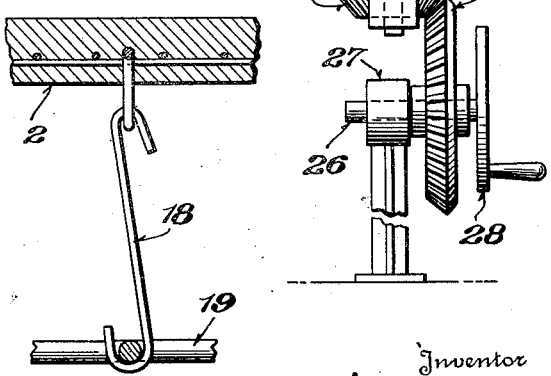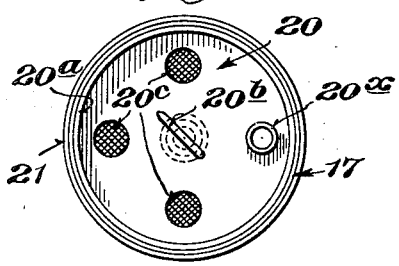

2,201,520

UNITED STATES PATENT OFFICE 2,201,520

FUME DIGESTER

William S. Callahan, Jacksonville, Fla.

Application April 19, 1939, Serial No. 268,846

7 Claims. (Cl. 183—54)

This invention relates to fume digesters for the purpose of collecting and treating fumes ordinarily discharged through the chimneys of manufacturing or industrial plants and the like, and the principal object thereof is to provide a novel means and method for eliminating the objectionable odors from the fumes generated in industrial plants and the like to prevent same from passing into the open air.

It is well known that the odors of fumes discharged through chimneys of a great many manufacturing plants are decidedly objectionable, and in many instances many types of plants in some neighborhoods have been forced to close as public nuisances, or to withstand heavy damage suits. Odors from such fumes are ordinarily objectionable in any community, and if not in fact injurious to the health cause persons to become nauseated and sick; moreover, property owners adjacent many such plants have in the past claimed substantial damage owing to the presence of such odors in and about their properties.

I have found that the fumes from such plants can be readily and inexpensively collected, handled, and treated so as to eliminate any objectionable odors, and I have provided a novel means and method for continuously deodorizing various fumes or gases which have obnoxious odors, utilizing a chemical contact method that can be well employed on a factory basis, since it involves subsequent recovery of the chemical, thereby reducing the cost of operation; also a novel means and method for not only removing said odors, but also one which will also remove solids or moisture from the fumes if present therein, the fumes from the plant being treated with a powdered odor-eliminating chemical and passed into a digester unit containing a plurality of bags or containers into which the chemical laden fumes discharge, the deodorizing reaction continuously taking place as long as the fumes are forced into the bags. The function of deodorization is essentially completed at the point in the system where the fumes and chemical are mixed, and tests of fumes discharged from the bags or containers of the unit show substantially no odor at all. Thus, the bags or containers may be porous to allow the passage of air therethrough, or may be solid-walled with openings at their tops, since the odors are for the most part removed by the chemicals at the point of entry of the fumes into the unit.

I will explain the invention with reference to the accompanying drawings which illustrate one practical embodiment thereof, to enable others familiar with the art to adopt and use the same; and will summarize in the claims, the novel features of construction, and novel combinations of parts, for which protection is desired.

In said drawings:

Fig. 2 is a horizontal section on the line 2—2, Fig. 1.

Fig. 3 is a partial top plan view of the unit, partly broken away, showing the arrangement of the reciprocable shaker frame below the top of the digester unit.

Fig. 4 is an enlarged section on the line 4—4, Fig. 2.

Fig. 5 is an enlarged section on the line 5—5, Fig. 3.

Fig. 6 is an enlarged detail showing the method of supporting the shaker frame from the top of the unit.

Fig. 7 is an enlarged section showing the closure head at the upper end of each bag or container.

Fig. 8 is a plan view of the head shown in Fig. 7.

Figure 1:
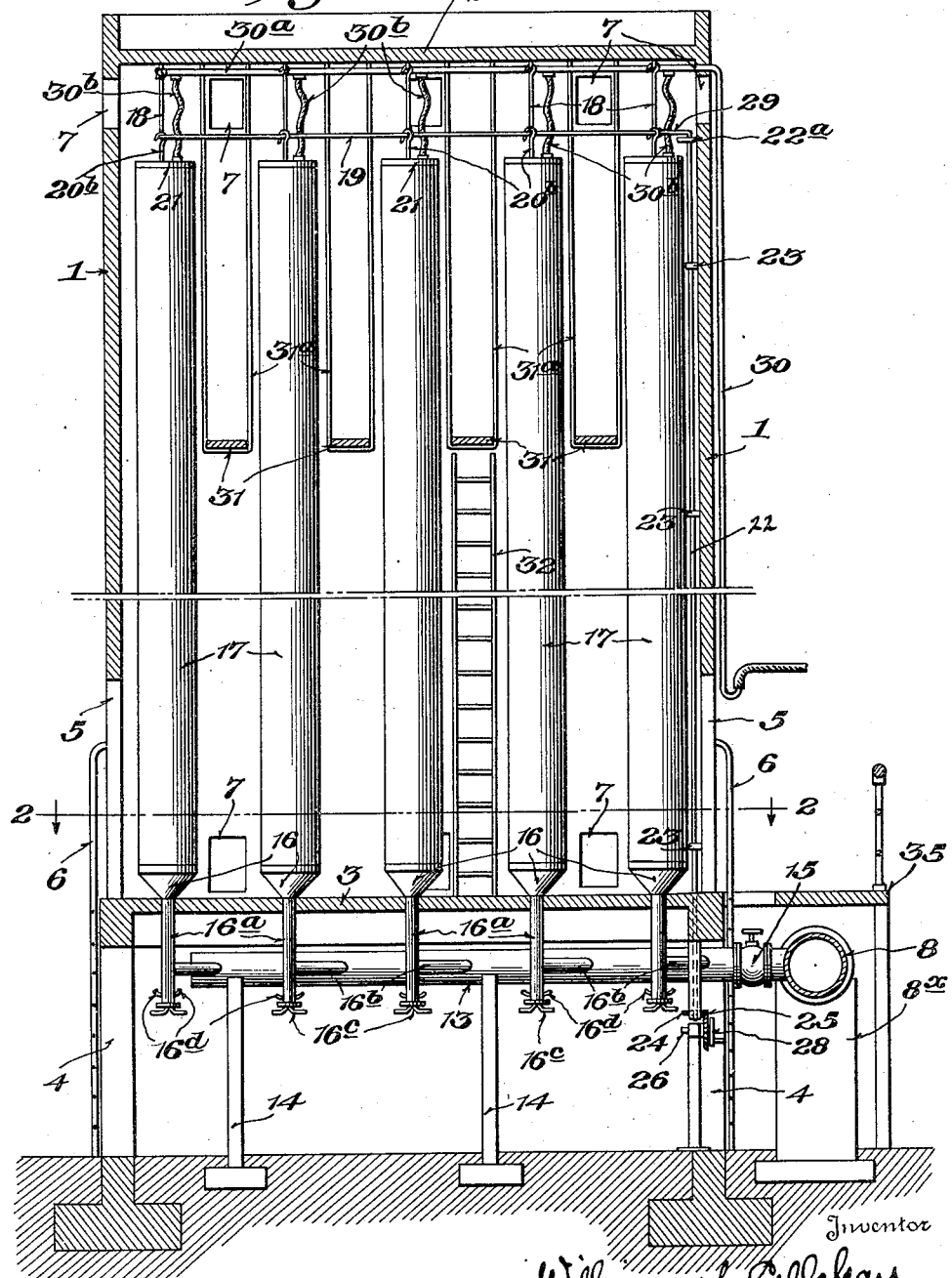
Fig. 1 is a vertical section through the digester unit.

My novel fume digester unit preferably comprises a building of requisite height, preferably formed of concrete and having a rectangular plan, the building consisting of side and end walls 1, a roof 2, and a floor 3 which latter is disposed well above the ground level, said building being mounted upon suitable foundation pillars 4. Preferably doors 5 are provided in the front and rear faces of the building, with ladders 6 on the exterior of the building to provide ready access thereto. Vents 7 are provided in each of the side and end walls of the building, preferably three or more such vents being provided near the floor and three near the roof in each wall to permit free circulation of air in and through the building. The digester building is disposed near the chimney of the industrial plant or the like (not shown) in connection with which the digester is to be used.

Extending substantially horizontally along the front of the digester building, somewhat below the level of floor 3, is a conduit 8 of relatively large diameter supported by pillars 8x, said conduit having a lateral branch 8a (Fig. 2) at its inlet end connected to the flue F leading from the base of the chimney of the plant, said flue F receiving all the fumes from the plant without permitting same to pass directly into the open air. If necessary, booster fans at desired intervals may be disposed in pipe F to maintain the requisite draft at the base of the chimney. Also, at the inlet end of conduit 8 is a blower or fan casing 9, preferably disposed axially of the conduit, for the purpose of forcing the fumes entering the conduit along by air pressure into the digester bags or containers 17 in the digester building.

In conduit 8, opposite the branch 8a and adjacent blower 9, is a relatively large hopper 10 (Figs. 2 and 4) for a chemical powder, such as a lime-soda mixture, said hopper having a contracted lower end 10a (Fig. 4) communicating with the conduit 8, the hopper being provided with hinged covers 10b. In the lower outlet end of hopper 10 is a reciprocable agitating screen 11 preferably of copper wire of about 18 mesh, said screen being operated by a rod 11a extending through the hopper and connected to an eccentric 12a on a shaft 12 driven by a belt 12b from a suitable prime mover controlled by a feed gauge or the like, so as to continually discharge the chemical into the hot fumes as they enter conduit 8.

In conduit 8, opposite the digester building are reducing T-fittings 8c connected respectively with a parallel series of feeder pipes 13 of smaller size than conduit 8 and supported horizontally below floor 3 upon supports 14, gate valves 15 being interposed between the feeders and their T-fittings whereby the connection between each feeder 13 with conduit 8 may be individually opened or closed. At opposite sides of each feeder 13 are spaced series of funnel-shaped bases 16 which form the bottoms of the dust collector bags or containers 17, which latter are suspended within the digester building as hereinafter described. The bags or containers 17 are secured in a substantially airtight manner to the funnel-shaped bases 16, the contracted lower ends 16a of bases 16 extending down through holes provided in the floor 3, and being directly connected, by lateral branches 16b of small size, with their respective feeders 13, whereby the chemical-laden fumes entering the feeders will be directed through the branches 16b and into the bags or containers 17.

Preferably the reduced portions 16a of the bases 16 extend below the feeder branches 16b, and are provided with removable plugs 16c to provide clean-outs whereby the chemical powder or other matter accumulating within the bags or containers 17 may be removed at desired intervals. Preferably hooks 16d are provided on the reduced portions 16a of bases 16 above the clean-out plugs 16c upon which hooks bags may be suspended to receive the powder discharged from the containers 17.

Suspended by hooks 18 (Fig. 6) from the roof 2 within the building, is a unitary skeleton frame 19 (Fig. 3) formed of pipe or bars having cross members disposed so that one member will overlie its respective row of bags or containers 17, said frame being horizontally reciprocably mounted in the upper portion of the building. The upper end of each bag 17, if of canvas or fabric, is supported by a closure head 20 (Figs. 3, 7 and 8) preferably comprising a disk-like plate having an upturned flange 20a, and provided with a centrally disposed hook rod 20b suspended from the reciprocable frame 19 as shown in Fig. 7. If the containers 17 are of solid material, such as metal, the heads 20 are preferably provided with one or more screened openings 20c (Fig. 8) therein. If the tube 17 is of fabric or porous material, I preferably provide at the base of flange 20a an annular external shoulder 20d upon which an external clamp ring 21 is adapted to seat, the upper end of each fabric tube or bag 17 being gripped between ring 21 and the outer wall of flange 20a of each head, whereby the bag 17 will be secured in vertical position within the digester building.

As shown in Figs. 1, 3 and 5, means are provided for shaking or reciprocating the frame 19 which supports bags 17, said means comprising a vertical shaft 22 supported in bearings 23 mounted upon one vertical wall 1 of the building, and extending downwardly through a sleeve in floor 3 of the building. Shaft 22 carries on its lower end a bevel pinion 24 meshing with a bevel gear 25 mounted upon a horizontal shaft 26 supported in a bearing 27 and having an actuating handle 28. On the upper end of shaft 22 is a head 22a, and a link 29 connects frame 19 with an eccentric on head 22a, whereby rotation of shaft 26 by handle 28 will rotate head 22a and reciprocate the frame 19 to shake the bags or containers 17, causing the powdered chemical collected therein to settle towards the bottom thereof so that same may be readily removed through the clean-outs when plugs 16c are removed.

To assist in cleaning out the bags or containers 17, I preferably provide pipes 30 (Fig. 1) having branches 30a extending under the roof 2 above each row of bags or containers 17, said branches 30a having flexible tubes 30b extending downwardly and connected to nipples 20x provided on the heads 20 of the bags in their respective rows, whereby air under pressure may be admitted through pipes 30, 30a and 30b into the upper ends of bags or containers 17, when the valves 15 of their related feeders 13 are closed, to blow the powdered chemical and other matter downwardly and out of the clean-outs when plugs 16c are removed. The powdered chemical may readily be collected in bags or other substitute containers suspended from hooks 16d for subsequent re-use in the system.

The digester building is preferably provided with platforms 31 (Fig. 1) running from side to side near the tops of the bags 17 and disposed between the rows of bags, said platforms being supported by suitable hanger rods 31a, and ladders 32 may be disposed at the walls within the building to provide ready access to said platforms. A suitable operating platform 35 may be provided at the front of the building above conduit 8 disposed adjacent the level of the floor 3.

In operation, the fumes are directed through flue F, which may be formed of wood or metal, laterally into the inlet end of conduit 8 of the digester building which latter is installed adjacent the chimney of the industrial plant, sufficient blowers or fans being installed within the flue F, if necessary, to force the hot fumes from the plant into said conduit and to create the necessary draft. As the fumes enter conduit 8 they are treated by chemical powder, which may be a lime-soda mixture, and which powder is sifted into the fumes entering conduit 8 at a desired rate of feed from hopper 10, by operation of the shaker screen 11. The axially disposed blower or fan 9 at the inlet end of conduit 8 insures that the hot fumes will be propelled by air pressure along the conduit with sufficient force to thoroughly distribute the lime-soda powder throughout the fumes and to force the mixture from the conduit 8 into the series of bags or containers 17 in the digester building. The mixing of the chemical with the fumes as above described in the conduit 8, coupled with the length of time that the fumes are in contact with the lime-soda powder in the bags or containers 17, is amply sufficient to eliminate all objectionable odors from the fumes, and permit the lime-soda powder to settle on the sides of the bags 17. While my unit is primarily designed to remove odors, it will also serve to remove any solids or moisture from the fumes. The operation is continuous, and does not require that the bags or containers 17 hold the chemical-laden fumes therein for any specified time, the deodorizing reaction taking place continuously as long as the fumes are in contact with the chemical. The function of deodorizing is substantially completed at the point of entry of the fumes into conduit 8, where the fumes and the chemical are mixed, and tests of the fumes emerging from openings in the tops or heads 20 of the bags show no appreciable odors. Thus it is immaterial whether the bags are porous to allow the passage of air therethrough or are solid walled and provided with vent openings, since most of the odors are in fact removed by the initial intermixing of the fumes and chemicals.

The powdered chemical withdrawn from the clean-outs 16c may be used repeatedly, and thus my above described method and means which utilizes introduction of a chemical into the fumes, and subsequent recovery of said chemical, reduces the cost of the operation to a minimum, and may be well employed on a factory scale or basis.

I claim:

1. A separator for dust laden gases, comprising one or more vertically disposed groups of dust collectors having restricted outlets to the atmosphere; a conduit for gases under pressure having a valved feeder for each group connected with the lower ends of the collectors in said group; shaking means supporting the upper ends of the collectors, and means for directing air jets into the tops of the collectors, said shaking means and air jets cooperating to remove the dust collected in a group of collectors when the related valve feeder connection is closed.

2. In a separator as set forth in claim 1, said collectors being arranged in a series of parallel rows, and the feeders being disposed between alternate rows.

3. A separator for dust laden gases, comprising one or more vertically disposed groups of dust collectors having restricted outlets to the atmosphere; said collectors having clean-outs at their lower ends; a reciprocable frame supporting the upper ends of the collectors; a conduit for the dust laden gases under pressure having a valved feeder for each group connected with the lower ends of the collectors in said group; means for directing air jets into the tops of the collectors, and means for reciprocating the frame to shake the collectors, said air jets and reciprocating means cooperating to remove the dust collected in a group of collectors when the related valve connection is closed and the clean-outs are opened.

4. In a separator as set forth in claim 3, perforated heads closing the upper ends of the collectors; and hooks on the heads engaging the frame.

5. In a separator as set forth in claim 3, said collectors being arranged in a series of parallel rows; and each feeder being disposed between alternate rows and being connected to the collectors of adjacent rows.

6. A separator for dust laden gases, comprising one or more vertically disposed groups of dust collectors having restricted outlets to the atmosphere; a conduit for the dust laden gases under pressure having a valved feeder for each group connected with the lower ends of the collectors in said group; clean-outs at the lower ends of the respective collectors for removing the dust collected in the individual collectors when their related valve connections are closed and the clean-outs are opened, means for shaking the upper ends of the collectors; and means for introducing air jets down into the upper ends of the collectors to force the dust through the clean-outs.

7. In a separator as set forth in claim 6; perforated heads closing the upper ends of the collectors; and said shaking means comprising a reciprocable frame disposed above the heads; hooks on said heads engaging the frame; and means for reciprocating the frame.

WILLIAM S. CALLAHAN.